Jan. 25, 1927.
S. H. WILLIAMSON
LIFTER
Filed May 23, 1925
1,615,732
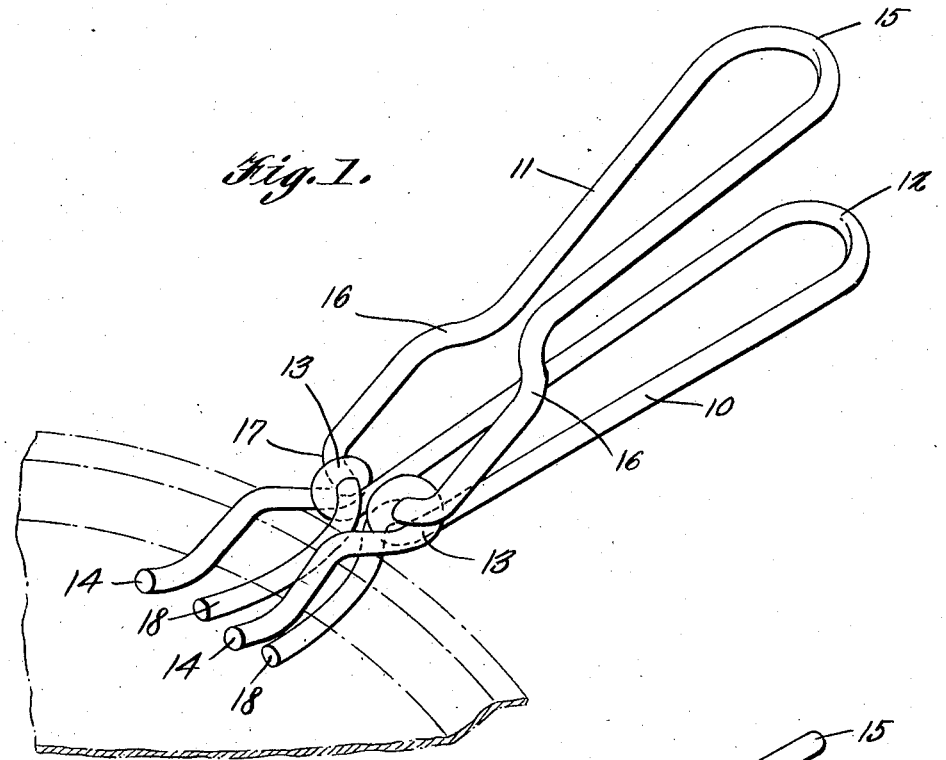
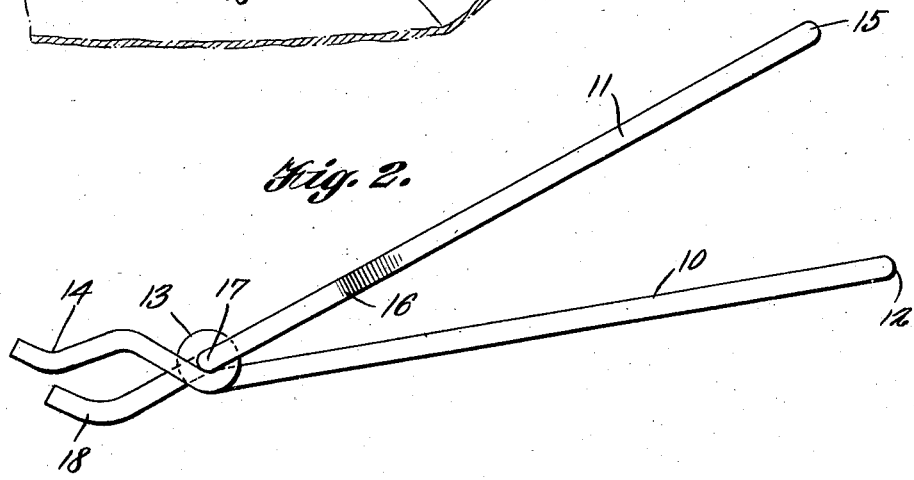
S. H. Williamson,
INVENTOR
BY Victor J. Evans
ATTORNEY
WITNESS:

Patented Jan. 25, 1927.

1,615,732

UNITED STATES PATENT OFFICE.

SAMUEL H. WILLIAMSON, OF DELIGHT, ARKANSAS.

LIFTER.

Application filed May 23, 1925. Serial No. 32,460.

This invention relates to improvements in lifters and contemplates the provision of two lengths of wire bent intermediately upon themselves to provide handle portions and having their outer free end portions looped and offset respectively and so interconnected and pivotally associated at these junctures so as to provide a very efficient fulcrum in order that the edge of hot cooking utensils may be readily and easily grasped.

Another object of the invention resides in the peculiar curvatures of the outer free ends of the wires in order that the same may be readily and easily inserted within a stove lid and when the other free ends of the companion wire are forced downwardly upon the top of the stove lid it will be noted that a locking grasp or hold of the stove lid may be readily removed and replaced as the case may be.

With the above and other objects in view, the invention further includes the following novel features and details of construction, to be hereinafter more fully described, illustrated in the accompanying drawing and pointed out in the appended claim.

In the drawings:—

Figure 1 is a detail perspective of my invention showing the manner in which the same may grasp the edge of a pan and the like.

Figure 2 is a side elevation thereof.

Referring to the drawing in detail, wherein like characters of reference denote corresponding parts, the reference characters 10 and 11 indicate companion lengths of relatively stiff and heavy wire. The bottom wire 10 is shown as being bent intermediately of its length as at 12 and has its outer free end portion extending in spaced parallel relation therefrom and each end including looped portions 13 adjacent the ends thereof from which looped portions extend the downwardly and outwardly curved end portions 14 therefrom.

The upper wire 11 is also bent intermediately of its length as at 15 and having its free end portions extending in inward and spaced relation therefrom and from whence outwardly extending offset portions 16 are provided in order that a hand hold is thus provided between these outwardly extending offset portions 16 and the intermediately bent portion 15.

As clearly illustrated in Figure 1 of the drawing, the remaining end portions of the upper wire 11 extend in spaced relation from the outwardly offset portions 16 and which are further bent inwardly or offset as at 17 in order that their respective ends may be passed through the looped portions provided in the bottom wire 10 and extend upwardly and outwardly as clearly illustrated as at 18.

In the mode of operation of the present invention it is clearly apparent and manifest that when the ends 18 of the upper wire 11 are inserted within the conventional form of opening or socket provided in a stove lid and then when forcing the upper and lower wires 10 and 11 relatively that the ends 14 will then engage the upper sides of the stove lid in order that the said lid will be firmly grasped in the process of placing or removing the same. It is also apparent that this device may be used to great advantage and as clearly illustrated in Figure 1 of the drawing, in moving hot cooking utensils, such as pans and the like owing to the relative association of the end portions 14 and 18 respectively.

The invention is susceptible of various changes in its form, proportions and minor details of construction, and the right is herein reserved to make such changes as properly fall within the scope of the appended claim.

Having described my invention what is claimed is:—

A lifter including a pair of companion lengths of wire each bent upon themselves at their intermediate portion, one of said lengths having its ends parallel and formed adjacent its extremities with looped portions and the extremities being formed with oppositely bent portions, the other length of wire having its ends converging a predetermined distance, oppositely disposed lateral offset portions at the ends of the converging portions, said ends extending parallel from the offset portions, the ends of wire at the outer ends of the parallel portion being offset inwardly and the extremities curved outwardly in opposed relation with one of the curved portions of the other wire.

In testimony whereof I affix my signature.

SAMUEL H. WILLIAMSON.